United States Patent [19]

Vogelaar et al.

[11] 4,233,040
[45] Nov. 11, 1980

[54] SELF-CLEANING ROTARY FILTER FOR THE COOLING AIR INLET OF AN ENGINE ENCLOSURE

[75] Inventors: Bernard F. Vogelaar, Moline; Bruce L. Warman, Silvis; James R. Nelson, Geneseo, all of Ill.

[73] Assignee: Deere & Company, Moline, Ill.

[21] Appl. No.: 922,398

[22] Filed: Jul. 5, 1978

[51] Int. Cl.$^2$ .................... B01D 33/22; B01D 35/02; B01D 35/18

[52] U.S. Cl. .................... 55/269; 55/290; 55/385 B; 55/400; 55/430; 55/431; 55/467; 55/500; 55/501; 55/509; 55/521; 180/54 A; 180/68 P

[58] Field of Search .............. 55/267, 268, 290, 269, 55/385 B, 400, 430, 431, 467, 500, 501, 509, 521; 180/54 A, 68 P

[56] References Cited

U.S. PATENT DOCUMENTS

| | | | |
|---|---|---|---|
| 387,437 | 8/1888 | Ortman | 55/500 X |
| 1,581,363 | 4/1926 | Streun | 55/290 |
| 1,837,836 | 12/1931 | Powell | 55/400 X |
| 2,473,501 | 6/1949 | Bahnson, Jr. | 55/431 X |
| 2,639,780 | 5/1953 | Hardy | 55/290 X |
| 3,837,149 | 9/1974 | West et al. | 55/290 X |

Primary Examiner—Kathleen J. Prunner

[57] ABSTRACT

The engine of a self-propelled combine is mounted in an enclosure having an inlet through which cooling air is drawn by an engine-driven fan. The air is filtered by a rotating disk-like screen mounted over the air inlet before passing through a radiator adjacent the inlet. A duct extends across the face of the disk from its center to periphery, changes direction and terminates with an open end adjacent the inlet side of the fan by-passing the radiator. The duct is also open adjacent the face of the screen so that the fan draws air through the duct, (some of the air being necessarily drawn from inside the screen as it passes the duct opening) so that foreign material filtered from the mass of cooling air being drawn through the unobstructed portion of the screen and held on the screen exterior surface is removed and carried through the duct. A trash knife rigidly attached to the periphery of the screen extends outwards parallel to the screen's axis of rotation. The knife is shielded by and travels within an annular channel-like shroud as the disk rotates. The shroud is connected with and intersects the duct so that as the screen rotates the knife passes through the duct, closely adjacent a shear bar supported there. The knife cuts or dislodges any foreign material lodged in the duct where it changes direction so that it may continue its passage carried by the air flow through the duct. A relatively flexible material with a high percentage open area is used for the filter element of the screen and is held taut by a compression spring pressing outwards on a thrust washer at the center of the screen to form it into a shallow cone.

33 Claims, 9 Drawing Figures

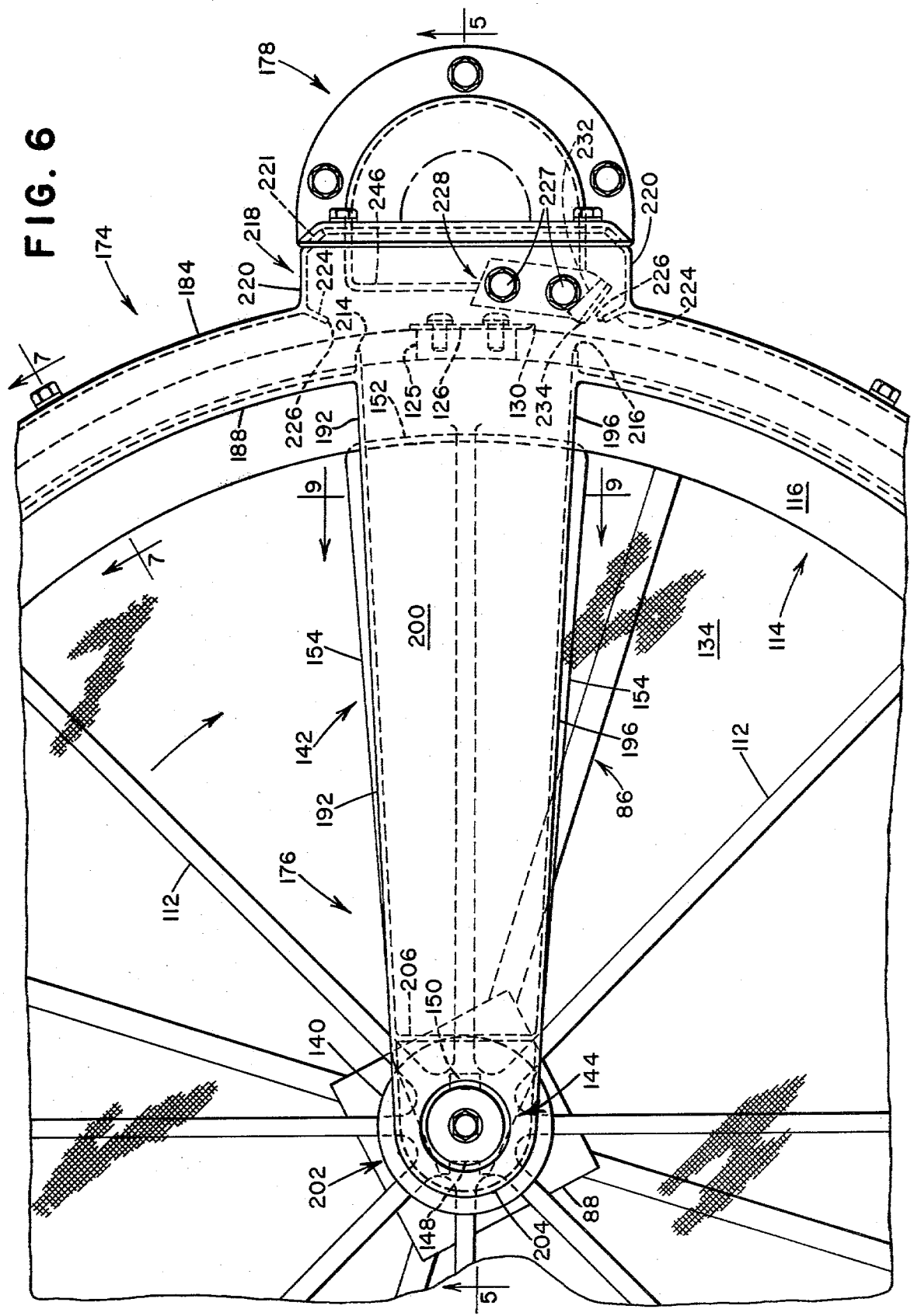

SELF-CLEANING ROTARY FILTER FOR THE COOLING AIR INLET OF AN ENGINE ENCLOSURE

BACKGROUND OF THE INVENTION

This invention relates to an internal combustion engine cooling system and in particular to improved means for filtering engine cooling air before it passes over a heat exchanger, such means being particularly useful on agricultural harvesting machines, such as combines and the like.

It has become conventional to at least partially enclose the engines of mobile harvesting machines and to mount a heat exchanger, such as a radiator, for cooling the engine within an enclosure. It is also well known to provide screens for filtering the cooling air drawn into the enclosure and also to provide means for removing from the screen accumulations of foreign materials, such as chaff and leaves, which occur in typical harvesting conditions.

Ideally, foreign material or trash removal should be automatic and continuous. Well known attempts to achieve this include the use of rotating screens in conjunction with baffles or ducts adjacent the screen to upset the flow of cooling air through the screen so that foreign material has an opportunity to fall off or be sucked off. U.S. Pat. No. 3,837,149, West et al, discloses a duct with an outlet end adjacent the engine cooling fan and an inlet opening adjacent to and spanning a portion of the rotating screen so that air is drawn through the duct and locally reverses the flow of air through the screen so that foreign material accumulated on the screen is removed and carried through the duct. However, it is generally necessary to provide a change of direction such as an "elbow" in such a duct and it is possible for some types of foreign material, such as elongated crop leaves, to lodge in the duct at the change of direction and create an obstruction which, in extreme conditions, may lead to a blocking of the duct, rendering the screen cleaner ineffective.

Another problem in the design of rotating cooling air screens is to provide an approximately flat but structurally stiff filter element while at the same time maintaining the maximum possible proportion of open area so as to achieve the maximum possible cooling system efficiency. It is known to use as a screen material a relatively stiff perforated metal sheet fabricated into a self-supporting cylindrical form. The extra total surface area of the cylinder compared with a given circular inlet opening compensates for the relatively low percentage open area of the material itself. However, such designs are inconveniently bulky and relatively costly to manufacture. It is also known to construct a flat rotary screen assembly using a more flexible, higher open area, material such as woven wire screen but it is difficult to provide a flat and stable screen surface even if the awkward and costly operations of stretching (and trimming) are used in its manufacture.

SUMMARY OF THE INVENTION

Accordingly, it is an object of the present invention to provide an improved rotatable air filter for a cooling air inlet opening and means for continuously removing or cleaning accumulated foreign material from such a filter and disposing of it reliably.

It is a feature of the invention to provide, in a cleaning device in which foreign material is drawn or sucked from the exterior surface of a rotating filter and carried through a duct or conduit, agitating means operable in the duct to faciliate maintenance of flow of material in the duct. The agitating means may take the form of a blade operatively associated with the rotating screen and arranged to intermittently enter the duct and engage material being conveyed through the duct to prevent lodging or build up of material. A shear bar may be mounted in the duct and the blade may, by itself, or in cooperation with the shear bar, cut or break material into smaller pieces as well as dislodge it. Such an agitating device is particularly useful adjacent a change in direction or cross section of a duct and in field operations where elongated pieces of leaf or other foreign material are present in the air.

An advantage of the invention is that it may be realized in a low cost form by attaching a blade at the periphery of a rotating screen with the blade extending so that as the screen rotates, the blade passes through a duct adjacent the exterior surface of the filter element by way of slots in the duct walls. The blade may be shielded for safety by providing an annular shroud which, if in hollow or channel form and mounted adjacent a wall in which the rotating filter is carried, completely shields the blade. The configuration and disposition of an inner wall of the shroud may be such that it streamlines air flow entering the filter and enhances the efficiency of the cooling system.

A feature of the invention is that the shroud may be made integral with a portion of the duct which it intersects so as to prevent air loss at the junction between shroud and duct and reduce cost of manufacture. In the shroud as a whole, generous clearances may be provided for the moving blade but to further reduce air losses and contribute to air efficiency, baffles may be provided so as to minimize the slot opening at the junction of the shroud and duct so that a minimum of air is drawn from the shroud into the duct.

It is a feature of the invention to form the filter element from a relatively thin flexible material having a high percentage of open area, tensioning the filter element in assembly into a stable structural form, for example by clamping a normally flat filter element at its perimeter and deflecting its center axially to tauten the material and shape it into a shallow cone, thus establishing a compact, nearly flat structurally stable filter element form with a high percentage of open area in relation to a given air inlet opening but without the use of air obstructing reinforcing frame members or spokes.

Air efficiency may be further enhanced by providing an air baffle opposite the extracting duct inlet opening, closely adjacent the interior side of the filter element so as to channel and locally increase the velocity and hence trash pick up and carrying capacity of the cleaning air entering the duct. An advantage of the present invention is that such a baffle may be supported cantilever fashion by the spindle or shaft on which the rotating filter is journaled.

BRIEF DESCRIPTION OF THE DRAWINGS

FIG. 6 is an enlarged partial right side elevation of the cooling air inlet area showing the vacuum chamber and duct assembly and a portion of the annular shroud;

DESCRIPTION OF THE PREFERRED EMBODIMENT

Figure 1:
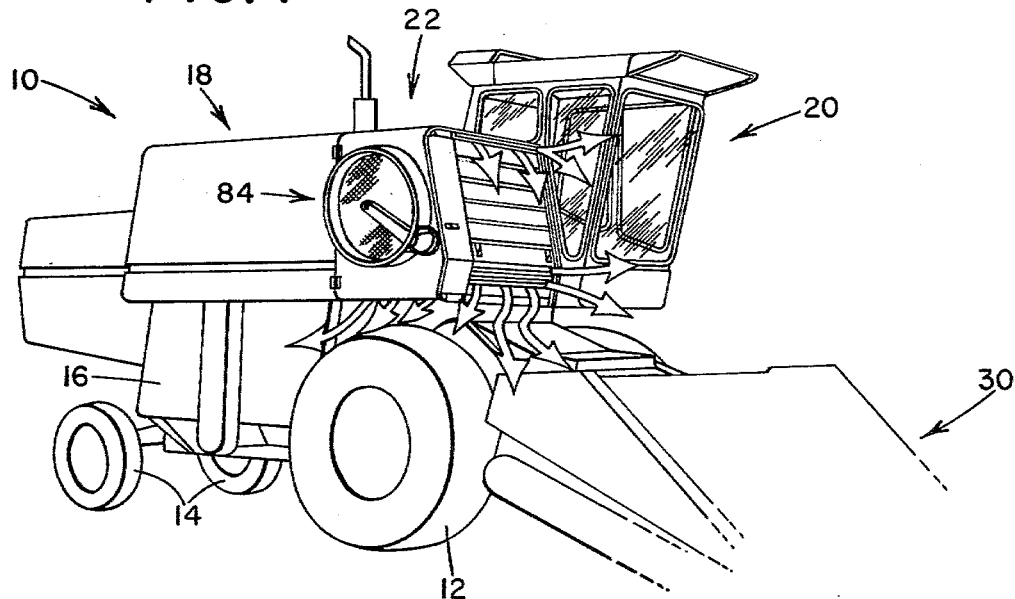
FIG. 1 is a right front perspective view of a combine including the improved engine enclosure and air filtering system with arrows schematically illustrating the air discharged from the engine enclosure.

The invention is embodied in a self-propelled combine having a main separator body or frame 10 mounted on a pair of forward drive wheels 12 and steerable rear wheels 14. The body has generally upright side walls 16 and an elevated grain tank 18 is mounted on a central portion of the body, the grain tank side walls being disposed outwardly of the body side walls 16. An elevated operator's station 20 is disposed at the left front of the body 10 immediately in front of the grain tank. A power unit enclosure indicated generally by the numeral 22 is disposed at the front of the body 10 immediately in front of the grain tank 18 and to the right of the operator's station 20. The enclosure 22 includes a generally horizontal top wall 24, a generally upright side wall assembly 26 in fore-and-aft alignment with the grain tank side wall and a front wall 28, the rear of the enclosure being formed by the front of the grain tank while a control console (not shown) at the right side of the operator's station is interposed between the left end of the enclosure 22 and the operator's station 20. The terms left and right are used with reference to a person standing behind the machine and facing in the direction of its forward travel. The general construction of such a combine is described in greater detail in U.S. Pat. No. 3,636,684, Vogelaar et al, also assigned to the assignee of the present invention. Carried at the front of the combine is a harvesting header, such as the conventional corn head 30 here, (only a partial outline of which is shown) for removing crop from the field as the machine advances.

The description which follows relates mainly to the enclosure 22 and the components which it houses and particularly to an improved means for filtering engine cooling air being drawn through the enclosure. This embodiment of the present invention includes many details of structure and function similar to those described in detail in U.S. Pat. No. 3,837,149, West et al, entitled "Engine Enclosure and Cooling System with Rotary Filter" and also assigned to the assignee of the present invention and only an outline description of such details will be given here.

Figure 3:
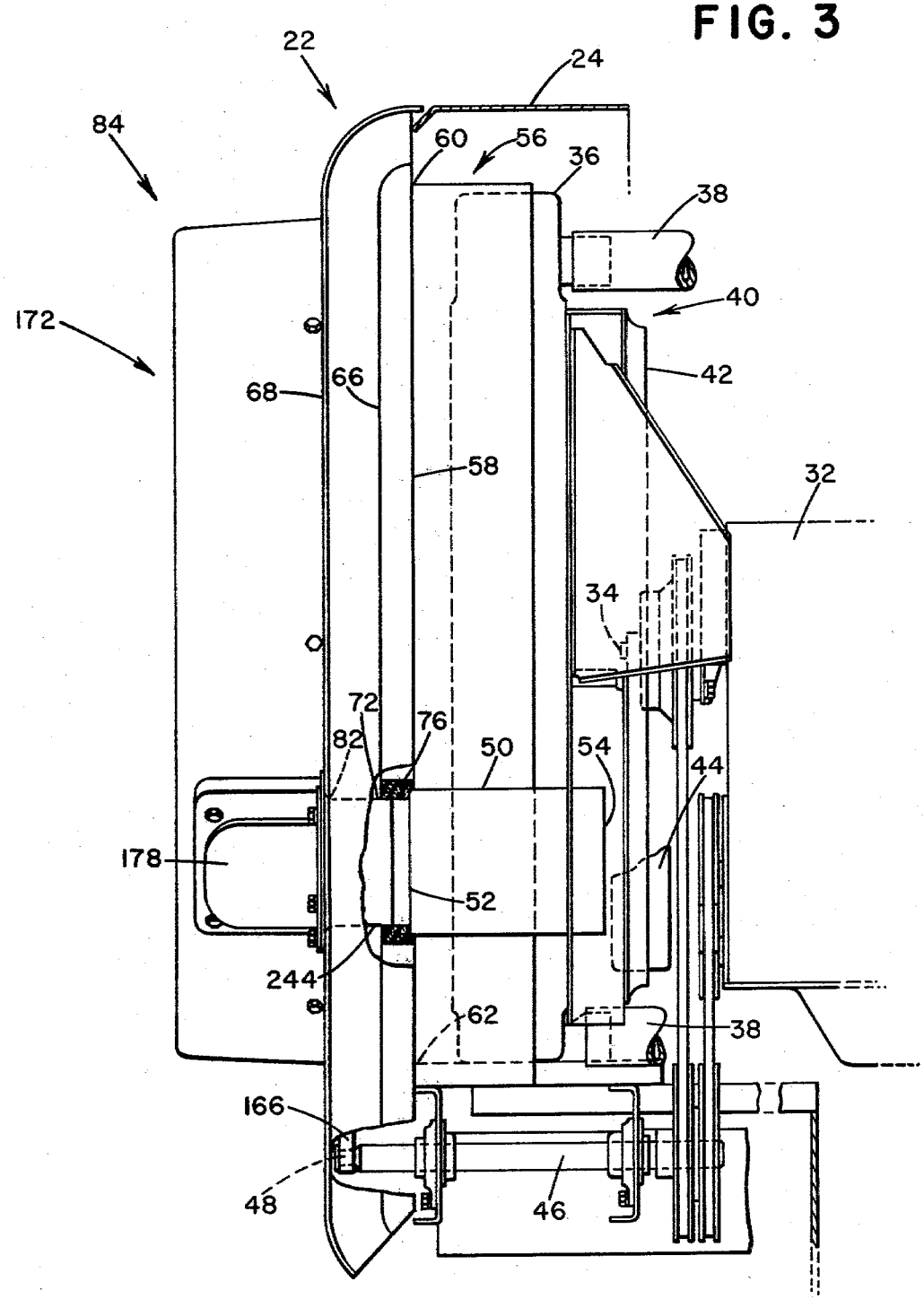
FIG. 3 is an enlarged front elevation of the right side of the engine enclosure with portions of the enclosure broken away to show the radiator and a fan and showing the rotary air filter assembly.

A transversely-oriented internal combustion engine 32 (shown only partially in FIG. 3) is mounted in the enclosure 22 and has an accessory drive shaft 34 extending from the right-hand end of the engine. A heat exchanger, such as the conventional radiator 36 shown here, upright and fore-and-aft extending, is mounted at the right end of the enclosure between the right side wall assembly 26 and the engine and includes conventional hoses 38 for conducting coolant to and from the engine. A fan shroud 40 is mounted between the engine 32 and the radiator 36 and has a relatively large circular opening 42 opposite the radiator core. A pull-type blower or fan 44 is coaxially mounted in the fan shroud opening 42 and is driven conventionally by the engine. A transversely extending jackshaft 46 having a grooved belt-drive portion 48 at its right-hand or outermost end extends beneath the radiator and is driven from the engine accessory shaft 34 by a V-belt drive.

Figure 2:
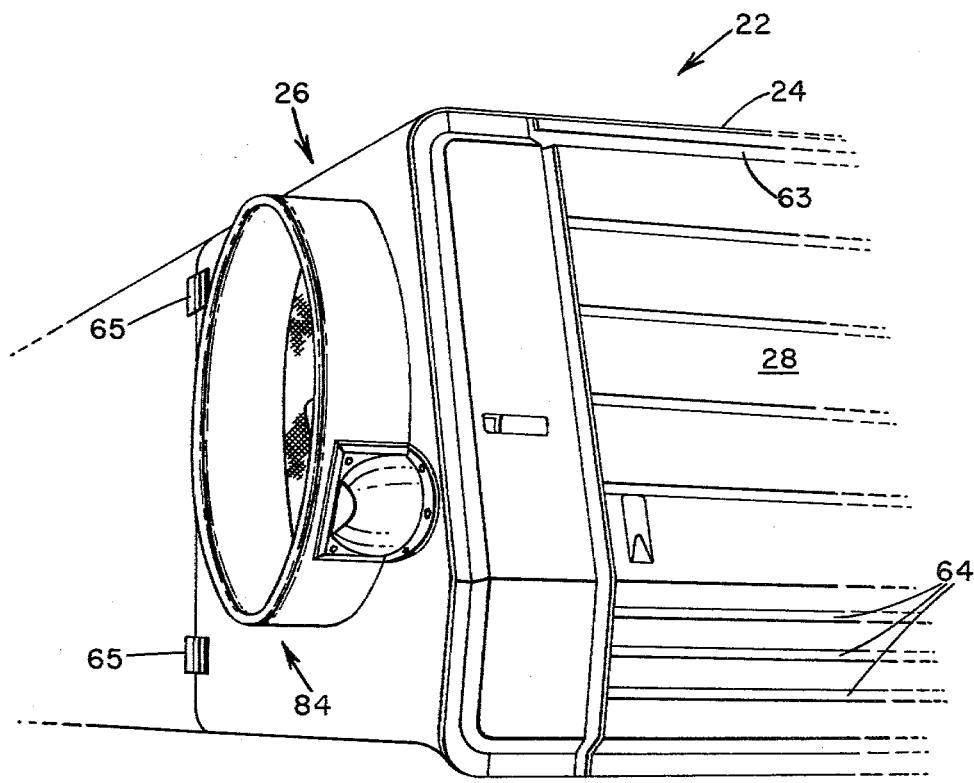
FIG. 2 is an enlarged right front perspective view of a portion of the engine enclosure showing the rotary air filter assembly.

Also mounted in the enclosure 22 and extending transversely closely forward of the radiator 36 is a duct or conduit 50 of generally trapezoidal cross section, having an open outer end 52 adjacent the interior of the right-hand side wall assembly 26 and an open inner end 54 opposite the intake side of the fan 44 so that the fan draws air through the duct. The duct 50 is offset rearwardly (not shown) downstream of the radiator 36 to place the opening 54 in proper relationship with the fan 44. A rectangular upright fore-and-aft frame 56 at the right side of the enclosure, immediately opposite the right side wall assembly 26, closely surrounds and partially transversely overlaps the radiator 36 and has an outer frame edge approximately flush with the outer or upstream opening 52 of the duct 50 and including vertical edges 58 and top and bottom edges 60 and 62, respectively. The enclosure front wall 28 includes upper and lower air outlet slots, 63 and 64 respectively (FIG. 2).

Figure 4:
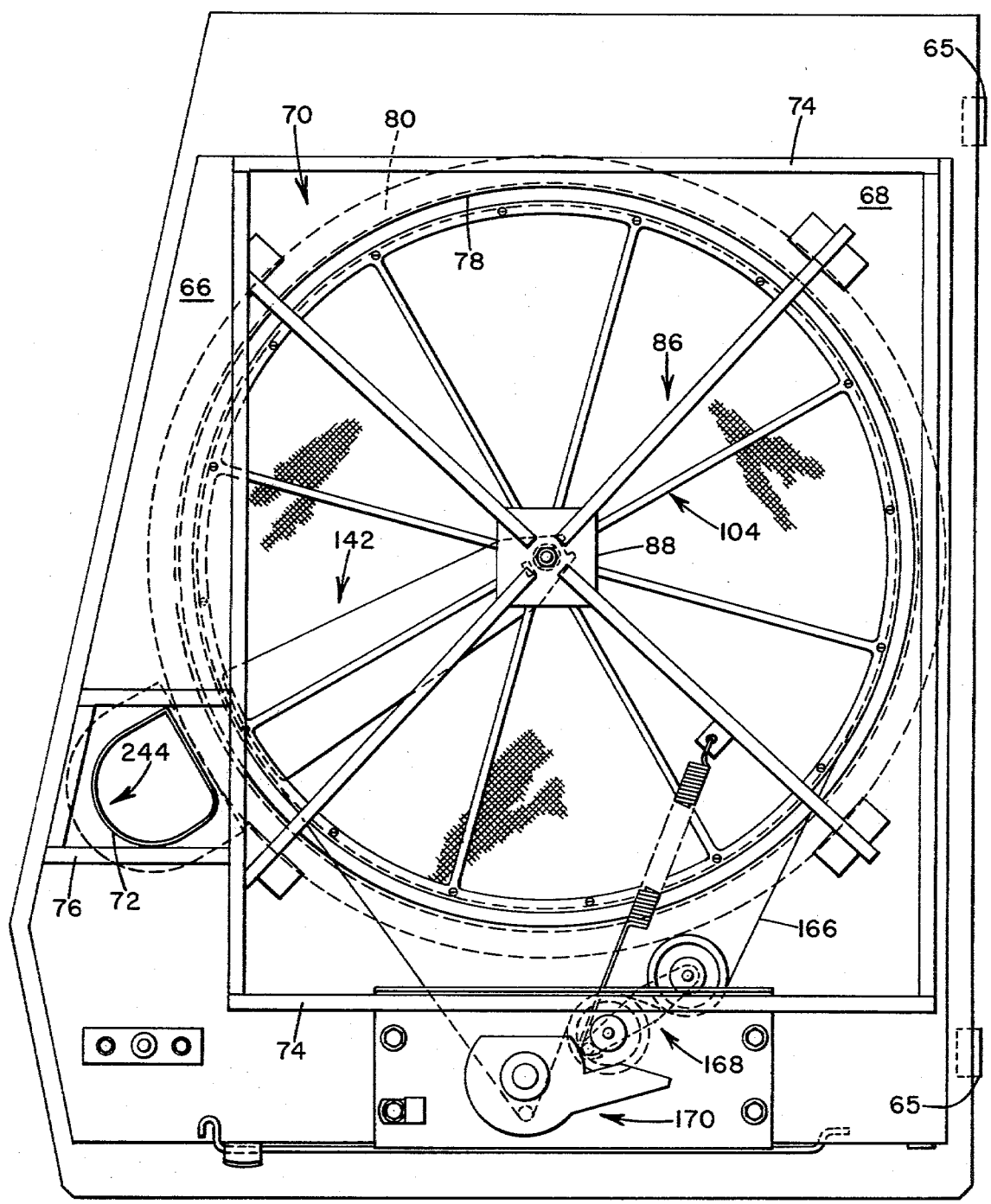
FIG. 4 is a somewhat schematic elevation of the interior side of a swingable side wall portion of the combine carrying major components of the rotary air filter assembly and showing particularly the drive for the rotary assembly and the trash extracting duct.

The entire enclosure right side wall assembly 26 is swingable about its rearward edge on vertical pivots 65 for service access (but is normally held in a closed position by suitable latches) and includes closely spaced parallel inner and outer walls 66 and 68, respectively. The inner wall 66 includes a rectangular opening 70 (FIG. 4) approximately transversely aligned with the radiator 36 and, adjacent to its forward side, an approximately semi-circular duct opening 72. A rectangular seal 74 surrounds the rectangular opening 70 and an approximately trapezoidal seal 76, formed partially by the seal 74, borders the semi-circular opening 72, the seals seating, when the side wall assembly 26 is closed and latched, against the outer edges of the rectangular frame 56 and the duct 50 respectively. The outer wall 68 of the side wall assembly 26 includes a relatively large circular inlet opening 78, approximately aligned with the rectangular opening 70 of the inner wall and surrounded by an outwardly turned lip or flange 80, and an approximately semi-circular opening 82 aligned with the similar opening 72 in the inner wall 66. Mounted over the inlet opening 78 is a rotary air filter assembly 84, the component and associated parts of which will now be described.

Figure 5:
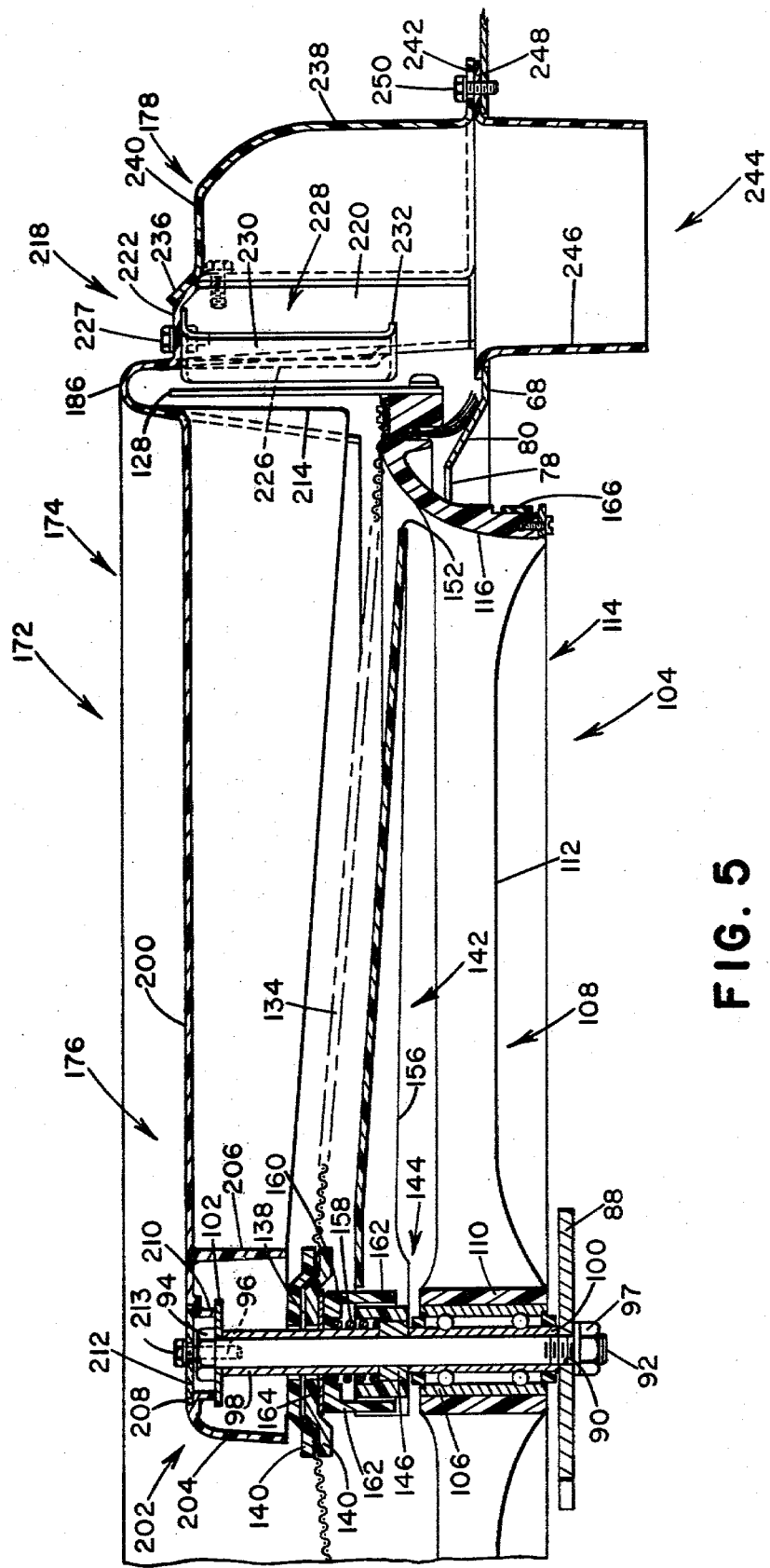
FIG. 5 is an enlarged partial sectional view approximately on line 5—5 of FIG. 6 showing the air filter shroud assembly including the vacuum chamber and also the rotary filter element.

A spider-like screen support frame 86 is mounted on the inside of the outer wall 68, spanning the inlet opening 78 and including a central mounting plate 88 centered on the opening. Mounted in a hole 90 in the plate and extending outwards in the opening and seen best in FIG. 5 is a draw or spindle bolt 92 with its head 94 outwards, the head including a drilled and tapped hole 96. Threaded on the bolt 92 between the head 94 and the mounting plate 88 are outer and inner bushings 98 and 100, respectively, forming part of a spindle assembly. A support washer 102 rests against the underside of the head 94. A rotary disk-like screen or filter element assembly, indicated generally by the numeral 104 is journaled on the inner bushing 100 adjacent the mounting plate 88 by means of a bearing 106. The disk assembly 104 includes a wheel-like screen carrier 108 having a central hub 110, radial spokes 112, and a rim indicated generally by the numeral 114. The rim 114 has a smoothly curving inner surface 116 similar in shape to an inlet bell used in conjunction with an axial flow fan.

Figure 8:
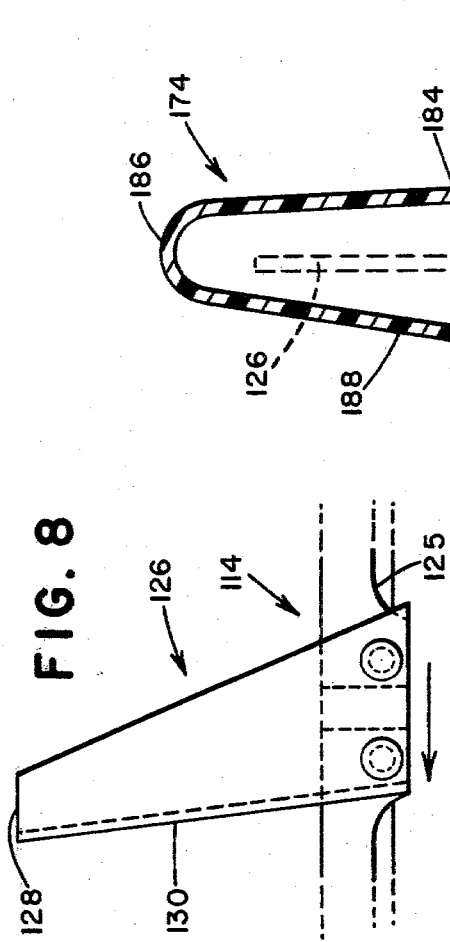
FIG. 8 is a partial view of the rim of the rotary filter element assembly looking radially inwards and showing the blade attached to the rim.
Figure 7:
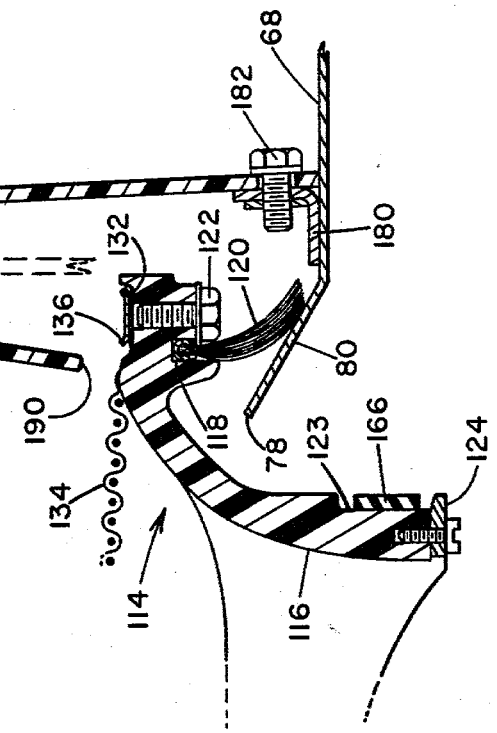
FIG. 7 is a further enlarged partial sectional view approximately on line 7—7 of FIG. 6 showing details of the rim of the rotary filter element assembly and its relationship to the periphery of the inlet opening and the annular channel of the shroud assembly.

As can be seen in FIGS. 5 and 7, the rim 114 overlaps the inlet opening flange 80 and includes an inward facing groove 118 in which an annular brush seal assembly 120 is retained by a retainer assembly 122 (seen best in FIG. 7), and which makes sealing contact with the flange 80. The radially outwards downstream portion of the rim 114 is a cylindrical belt drive surface 123 bordered by an annular belt guide 124. The rim 114 also has a locally enlarged peripheral portion comprising a blade mounting pad 125, seen best in FIG. 8, and carrying an agitating means such as the elongated blade 126 which extends perpendicularly outwards relative to the outer wall 68 of the side wall assembly 26. The blade has an outer tip 128 and a beveled cutting edge 130. Close to the outer perimeter of the rim 114 is an outward facing annular groove 132 in which the outer perimeter of a circular or disk-shaped screen 134 of foraminous material is clamped by retaining strips 136 (as seen best in FIG. 7). The screen includes a center hole 138 (FIG. 5) bordered and reinforced by a pair of clamping washers 140 which sandwich the screen between them and are centered on the outer bushing 98.

Also threaded onto the spindle bolt 92, between the screen carrier wheel 108 and the screen 134, is a paddle-shaped baffle 142. The baffle is supported cantilever fashion by the spindle bolt 92, being clamped between the inner and outer bushings 100 and 98, respectively, when the nut 97 is tightened. The baffle 142 is preferably of injection-molded plastic construction and includes a central portion 144 into which is molded a metal bushing 146, providing an effective structural design for clamping the baffle 142 in the spindle assembly between the outer and inner bushings 98 and 100. The central portion 144 of the baffle also includes, diametrically opposed from each other, a notch 148 and a slot 150. The main portion of the baffle tapers from the central portion 144 outwards to an arcuate outer edge 152 adjacent the rim inner surface 116 and has diverging opposite edges 154. The baffle is reinforced by tapered ribs 156 running from the central portion 144 radially outwards.

Threaded onto the outer bushing 98 and bearing on the outer end of the baffle bushing 146 is a helical compression spring 158, the other end of which bears against the inner surface of a thrust washer 160 prevented from rotating by a pair of integral diametrically opposed lugs 162 engaging the notch and slot 148 and 150, respectively, of the baffle central portion 144. The thrust washer 160 is preferably of a suitable plastic material and an additional thin steel thrust washer 164 serves as a bearing between the outer face of the thrust washer 160 and the clamp washers 140 attached to the screen 134.

The rotary disk assembly 104 is driven from the groove portion 48 of the jackshaft 46 by a belt 166 trained around the rim 114 and engaging the belt drive surface 123 of the rim. Belt tension is maintained by a spring loaded idler assembly 168 carried by the side wall assembly 26 and indicated in FIG. 4 and a belt displacing cam arrangement indicated generally by the numeral 170, also carried by the side wall assembly 26, is provided so that the belt 166 may be displaced downwards out of engagement with the groove portion 48 of the jackshaft 46 before the side wall assembly 26 is swung open.

The rotary filter assembly 84 also includes an annular shroud assembly indicated generally by the numeral 172 which includes an annular shroud or channel portion 174, carried on the outer wall 68 of the side wall assembly 26 concentric with the rotary screen assembly 104, a partial vacuum chamber portion 176 extending radially from the center of the screen to the annular shroud and a duct cover 178. The annular shroud 174 has an unequal leg channel cross section, best seen in FIG. 7, and is attached to the outer wall 68 by a series of clips 180 and fasteners 182. The channel form is composed of an outer wall 184 having an inner edge closely adjacent the right side wall outer wall 68, a radius cap portion or rim 186, and an inner wall 188 which terminates in an edge 190 adjacent the exterior of the screen 134, the edge 190 having an inside diameter approximately equal to the maximum diameter of the curved inner surface 116 of the rim 114. The walls 184, 188 have frusto-conical surfaces and converge from points adjacent the screen 134 towards the cap portion 186.

Figure 9:
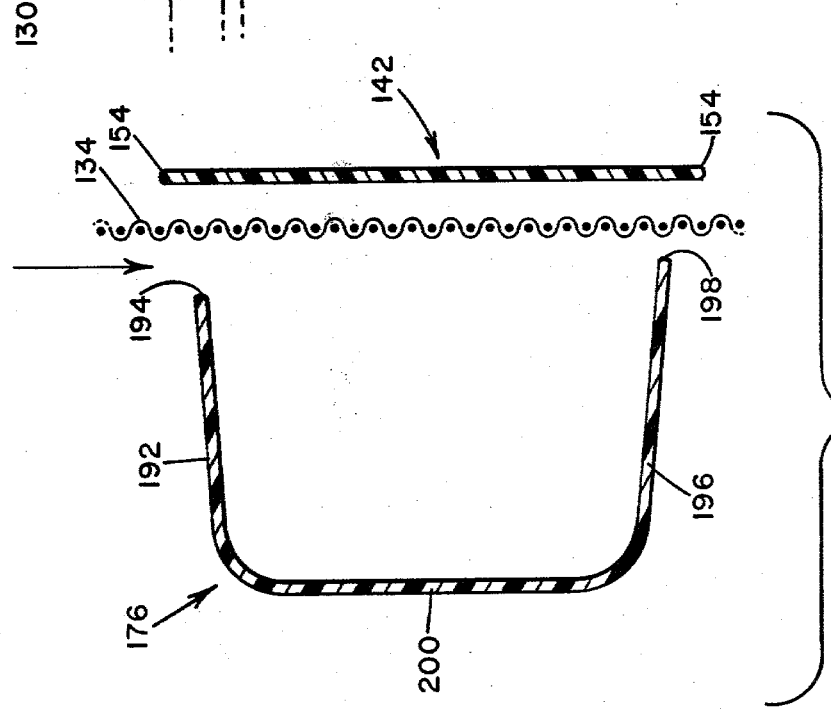
FIG. 9 is an enlarged partial cross sectional view approximately on line 9—9 of FIG. 6 showing the vacuum chamber and baffle and the screen passing between them.

The vacuum chamber (or radial duct) portion 176 consists principally of another unequal leg but much wider channel cross section portion, as seen best in FIG. 9, open towards the screen 134 and having a leading (in terms of the direction of screen rotation) wall 192 with an inner edge 194 extending parallel to the exterior surface of the screen 134, a trailing wall 196 with an inner edge 198 also parallel to the screen 134 and an outer wall 200. Roughly concentric with and covering the outer portion of the spindle assembly is a vacuum chamber support portion 202 which includes a roughly semi-circular wall 204 contiguous with the vacuum chamber leading and trailing walls 192 and 196, respectively, and extending between those walls, an internal baffle 206 (FIGS. 5 and 6). In the center of the vacuum chamber support portion 202, the outer wall 200 is formed into a recess 208 with an inward extending collar 210 which bears against the support washer 102 adjacent the head 94 of the spindle bolt 92. The vacuum chamber support portion 202 is secured in this position by a retaining washer 212 and a cap screw 213 screwed into the spindle bolt head 94.

At the junction of the vacuum chamber 176 with the annular shroud 174, the shroud inner wall 188 is interrupted and the vacuum chamber walls 192, 196 extend a short distance into the annular channel, forming small baffles and terminating in edges 214 and 216 extending approximately axially in relation to the rotary screen (FIGS. 5 and 6). The outer wall 184 of the annular shroud is also interrupted opposite the vacuum chamber portion 176, the opening so formed communicating with an integral duct transition portion 218 which has radially extending opposite walls 220 flanged inwards (221) at their outer extremity and an outer wall 222 also flanged inwards. The walls 220 of the transition portion are offset outwards in relation to the vacuum chamber walls 192 and 196. From the opposite junctions between the shroud outer wall 184 and the walls 220 of the duct transition portion 218, short obliquely disposed baffles 224 extend towards the vacuum chamber wall baffle portion edges 214 and 216. These baffles also have edges 226 extending approximately axially so that at the junction between the annular shroud channel and the vacuum chamber or radial duct 176, a relatively narrow axially extending slot is created (FIG. 5). Secured to the inside of the outer wall 222 of the duct transition portion 218 by fasteners 227 is a shear bar 228 having a main flat portion 230 extending approximately axially in relation to the rotary screen and terminating in a bent down tip 232 axially somewhat inwards of the surface of the rotary screen 134. The flat or bar portion 230 has a leading or shearing edge 234 disposed approximately parallel to and in radial alignment with the trailing wall 196 of the vacuum chamber 176. The duct cover 178 has flanged edges 236 mating with the flanged edges of the transition portion 218, an approximately semicircular wall 238 and a cap portion 240 and, at the base of the wall 238, a mounting flange 242. Mounted in the side wall assembly 26 is a duct connector 244 having a duct portion 246 of approximately semi-circular cross section extending through the openings 82 and 72 in the outer and inner walls 68 and 66, respectively, and a mounting flange 248 sandwiched between the mounting flange 242 of the duct cover 178 and the outer wall 68, both the duct cover and the duct connector being secured to the wall by fasteners 250.

In assembly, the components piloted by the spindle bolt 92 are arranged on the bolt as described above and indicated in FIG. 5. The baffle 142 is timed so that it is immediately and symmetrically behind the vacuum chamber portion 176 (see FIG. 6) and the nut 97 is tightened so that the bushing 146 of the baffle assembly is clamped between the bushings 98 and 100 and the baffle is thus secured and supported, cantilever fashion and stationary between the screen 134 and the screen carrier 108.

The method of supporting the screen 134, which does not rely on any rigidity or stiffness of the screen material itself, allows a relatively light material with a high percentage of open area to be used. For example, a low carbon steel, 14 mesh woven wire screen, with 0.020 inch wire diameter, 51% total opening and openings 0.051 inches square has been successfully used. Compared with perforated metal, a woven material has two advantages with respect to air flow. Its structure makes significantly greater percentage opening feasible and the individual openings, defined by a rounded filament as in woven wire, have a more favorable orifice coefficient. In assembling the rotary filter element assembly 104, the screen 134, in a flat condition, is first secured to the rim 114 of the screen carrier wheel 108, with the clamping washers 140 attached at the center of the screen. When assembly to the spindle is completed, the center of the screen is subjected to an axially outward force by the spring 158 through the thrust washer 160. The screen is thus shaped into a shallow cone and the material is placed in tension and kept taut in operation by the constant pressure of the spring, providing a regular screen surface, stable and predictable, and air can flow freely inwards through the screen unobstructed by any screen support members immediately adjacent the screen. The absence of such support members also makes it possible to optimize the location of the baffle 142 close to the interior side of the screen 134. The brush seal 120 is continuous around the rim 114 so that substantially all air entering the inlet must pass through the openings in the screen.

There are substantial advantages in appearance, in control of air flow and in manufacturing cost reduction (both parts and assembly costs) from integrating the vacuum chamber 176, the annular shroud 174 and the duct transition portion 218 into one unit, described above as the shroud assembly 172. As an example of an appropriate material, fabrication using an injection molded 20% glass coupled polypropylene has been successful. The shroud assembly, projecting outwards from the engine enclosure side wall protects the rotating screen from possible damaging contact with objects, such as tree branches or from mud thrown by the wheels 12. The duct cover 178 is removable for access to the blade and shear bar if required.

In the present embodiment, efficient operation of the cooling air cleaning system is obtained when the rotary filter element 104 is driven at relatively slow speeds, for example in the range of 80 to 100 rpm. It will be clear that in each revolution of the screen, the blade 126 will pass through the air passage or conduit which extends across the face of the screen and then axially inwards to the inlet side of the fan and which is composed of the vacuum chamber portion 176, the duct transition portion 218, the duct cover 178, the duct connector 244 and the duct 50. As can be seen from FIG. 5, the tip 128 of the axially extending knife reaches beyond the outer wall 200 of the vacuum chamber 176 so that the knife, in effect, intermittently entering the passage, completely sweeps the cross section of the passage adjacent the elbow or change of direction of the air passage adjacent the periphery of the screen. This part of the passage, where the chamber 176 and annular channel 174 intersect may be considered an outlet from the vacuum chamber.

As can be seen from FIG. 6, the blade 126, in each passage through the conduit, will pass close to the shear bar 228 so that the leading edge 130 of the blade and the shear bar edge 234 are momentarily close and in a shearing relationship. The shear bar spans the axial extent of the passage, but as can be seen in FIG. 6, will be substantially just outside the air stream flowing from the vacuum chamber 176 into the connector duct 244, minimizing the possibility of trash catching on it. This location of the shear bar, on the trailing side of the passage, also ensures that the blade 126 has no further opportunity to intercept and possibly transport trash particles after its shearing or stripping encounter with the shear bar, and until it re-enters the passage for its next sweep. As best seen in FIG. 6, the offset of the trailing wall 220 from the chamber wall 196 along with the baffle 224 upstream and the flanges 221 downstream form a recess or alcove in which the flat portion 230 of the shear bar 228 is substantially accommodated. It may also be noted that as can be seen in FIGS. 5 and 6, the shear bar 228 is shaped so that any of its radially inward edges act as "ramps" to deflect the blade 126 without any "hooking" should it inadvertently make contact with the shear bar.

The moving blade 126 is always safely shielded within the shroud assembly and as can be seen from FIG. 7, in which the blade is shown in phantom outline, generous clearance is provided in the internal channel of the annular shroud 174 to allow for eccentricities or distorsions of components. However, at the junction between the channel and the vacuum chamber portion of the air passage, baffles are provided as described above defining by their adjacent edges 214 and 226, and 216 and 226 (FIGS. 5 and 6), respectively, at opposite sides of the air passage, relatively narrow slots for entry and exit of the knife from the passage so that a minimum of air efficiency is lost through drawing of air from the channel of the shroud 174 instead of only from the vacuum chamber 176. It will be appreciated that the design and construction of the components involved here make feasible at this point lower clearances for the blade 126 than are desirable during the remainder of its travel through the annular channel 174.

In field operation, the fan 44 pulls air inwardly through the screen 134 and through the radiator 36 and then discharges the air into the engine enclosure past the engine 32. The closely spaced openings of the screen material are large enough to admit a large volume of air flow while filtering out trash that might plug the radiator or other heat exchangers in the enclosure. The construction of the swingable side wall 26 is such that, aided by the seal 74 around the rectangular opening 70 and the frame 56 around the radiator, substantially all air passing through the radiator 36 must first pass through the inlet opening 78 and hence through the screen 134. The structure between the screen and the radiator forms in effect a duct or secondary enclosure within the main enclosure 22. The engine enclosure is thus slightly pressurized by the fan and the air is discharged through enclosure outlet openings such as the slots 63 and 64 in the front wall 28 and other outlets not discussed here. Arrows in FIG. 1 indicate some of the directions taken by this discharged air, which is useful in keeping some of the external portions of the combine free of trash.

Because of the disposition of the open end 54 of the duct 50 adjacent the inlet side of the fan 44, the fan also draws air through the duct 50 and the duct elements upstream of it creating a partial vacuum and air flow in the vacuum chamber 176. Air is drawn into the vacuum chamber by reverse air flow outwards from the interior side of the screen opposite the chamber as well as directly through the slots between the bottom edges 194 and 198 of the vacuum chamber walls (FIG. 9) and the screen 134, there being locally a diversion or upsetting of the flow of a portion of the cooling air. Filtered foreign material held on the exterior side of the screen is thus released or sucked from the screen and carried in the air flow through the air cleaner passage bypassing the radiator, the contaminated air being discharged with the remainder of the air drawn through the radiator. The close proximity of the vacuum chamber edges 194 and 198 to the screen also produces a scraping or wiping effect which helps remove larger pieces of trash as the screen rotates. As can be seen in FIG. 9, the leading wall 192 is somewhat shorter than the trailing wall 196 so as to allow trash carried by the moving screen 134 to enter the vacuum chamber before being removed by the air flow. The baffle 142 substantially overlapping the entire inlet opening of the vacuum chamber 176 helps control air movement locally to improve the efficiency of trash removal from the screen by blanking off part of the interior side of the screen. As can be seen from FIG. 6, the open inlet side of the vacuum chamber 176 spans the screen 134 radially so that the entire open area of the screen is swept by the stationary vacuum chamber as the screen rotates. The repeated entry of the blade 126 into the passage near the elbow, (change of direction) where in some conditions long material may lodge and may contribute to an accumulation of smaller particles, clears that area through agitating and dislodging material and breaking brittle particles as well as directly shearing material against the shear bar 228.

The use of a streamlined inlet bell configuration for the rim 114 of the screen carrier, which decreases in internal diameter in the direction of air flow, allows the use of a screen outside diameter at least as great or greater than the diameter of a given inlet opening (78). As is seen in FIGS. 5 and 7, the screen carrier rim 114 overlaps externally the rim of the inlet opening 78 in the side wall 68 and the effective screened inlet area may be, as in this embodiment, somewhat greater than the area of the inlet opening itself, contributing to the air efficiency of the cooling air system. The frusto-conical wall 188 of the shroud forms an outward extension of the streamlined air inlet.

We claim:

1. In an agricultural machine having a mobile body and a power unit carried by the body, the power unit including a wall having an air inlet, an internal combustion engine, a heat exchanger for cooling the engine and a blower operable to draw cooling air through the inlet and over the heat exchanger, an improved air cleaning apparatus for the cooling air comprising:

a rotatable air filter supported adjacent the wall and having an axis of rotation and including a filter element, having a foraminous portion and exterior and interior sides, covering the inlet for filtering and holding on its exterior side foreign material from the cooling air moving through the inlet;

means for rotating the filter in a given direction;

a duct having, in relation to the direction of filter rotation, opposite leading and trailing walls and an exterior wall extending between said leading and trailing walls and having an air inlet opening adjacent the exterior side of the filter element, said duct inlet opening spanning a portion of the filter element and disposed so that as the filter rotates, other portions of the filter element move past and adjacent the opening, each portion passing in sequence adjacent the leading and trailing walls respectively, said duct being connected to the blower so that the blower draws cleaning air through the duct and through the duct inlet opening, a portion of said cooling air being diverted from the interior side of the filter element and drawn outwards through the filter element and entraining foreign material held on the exterior side of the filter element and carrying it through the duct; and agitating means operatively associated with and responsive to air filter rotation for entering the duct intermittently and engaging at least a portion of the foreign material in the duct so as to facilitate its passage through the duct.

2. The invention defined in claim 1 wherein the agitating means includes a blade attached to the filter and extending from the exterior side of the filter so that it is carried in a circular path as the filter rotates and wherein the duct is interrupted so as to define a slot disposed so that as the filter rotates, the blade passes through the slot and hence through the duct.

3. The invention defined in claim 2 and further including an annular shield carried by and externally of the power unit wall, concentric with the filter, intersecting and interrupted by the duct adjacent the slot and substantially enclosing the path of the blade.

4. The invention defined in claim 2 wherein the filter element comprises an approximately flat disk and the blade is disposed adjacent the perimeter of said disk.

5. The invention defined in claim 2 wherein the blade extends approximately parallel to the axis of rotation and as it passes through the duct substantially spans the interior of the duct.

6. The invention defined in claim 2 and further including a shear bar supported in the duct and disposed so as to be in a material shearing relationship with the blade as the filter is rotated and the blade passes through the duct.

7. The invention defined in claim 6 wherein the shear bar has a shearing edge and the shear bar is disposed so that the shearing edge is approximately parallel to and coplanar with the duct trailing wall.

8. The invention defined in claim 2 wherein the blade extends outwards away from the power unit wall and further including an annular shroud carried by and externally of said wall having an outer wall adjacent to and radially outside of the path of the blade and intersecting and interrupted by the duct so as to shield the blade as the filter is rotated.

9. The invention defined in claim 8 wherein the blade is supported cantilever fashion and has an outer tip and the shroud further comprises an inner wall adjacent to and radially inside the path of the blade and intersecting and interrupted by the duct, and a cap portion connecting the inner and outer shroud walls so as to form an annular channel substantially enclosing the path of the blade.

10. The invention defined in claim 9 wherein the shroud inner wall has an inner edge disposed closely adjacent the exterior side of the filter element.

11. The invention defined in claim 9 wherein the slot in the duct is defined approximately by the intersections between the shroud walls and the duct walls.

12. The invention defined in claim 11 wherein adjacent at least one intersection of a shroud wall with a duct wall a baffle extends into the annular channel so as to limit the width of the blade slot to less than that of the annular channel and restrict air movement between the annular channel and the duct.

13. The invention defined in claim 11 wherein said shroud and a portion of the duct including that portion including the air inlet are formed of the same material as one unit.

14. The invention defined in claim 13 wherein the material is molded plastic.

15. The invention defined in claim 9 wherein the rotatable air filter comprises a wheel-like carrier for the filter element having a rim concentric with the axis of rotation and a plurality of large openings collectively surrounded and partially defined by the rim and wherein the filter element is carried by the carrier so as to extend over and screen the openings, the rim having an internal surface decreasing in diameter in the direction of air flow through the inlet so as to streamline air flow at the periphery of the inlet.

16. The invention defined in claim 15 wherein the inlet in the power unit wall is circular and the maximum internal diameter of the rim is greater than the diameter of the air inlet.

17. The invention defined in claim 15 wherein the inner wall of the shroud decreases in diameter in the same direction as the inner surface of the rim and the minimum internal diameter of the shroud inner wall is approximately equal to the maximum internal diameter of the rim internal surface so that flow of cooling air adjacent the shroud and carrier rim is streamlined.

18. The invention defined in claim 15 wherein the periphery of the foraminous portion of the filter element is circular and has a diameter not less than about equal to the minimum internal diameter of the inner wall of the shroud.

19. In a mobile agricultural machine having a body and a power unit including an internal combustion engine supported by the body, the engine generating waste heat energy in operation, the combination therewith of an improved enclosure and cooling system for the power unit comprising:

an enclosure mounted on the body for enclosing at least part of the power unit and having walls;
an air inlet in one of said enclosure walls;
a rotatable air filter including a foraminous filter element mounted on said enclosure wall over the air inlet for filtering foreign material from air moving inwards through the air inlet;
drive means for rotating the filter;
an air outlet in the enclosure;
a heat exchanger mounted within the enclosure and connected to the engine so as to receive at least a portion of the waste heat energy, for cooling the engine;
a blower mounted and operatively connected to and driven by the engine for moving air inwards through the filter element and at least a portion of the air through the heat exchanger so as to receive waste heat energy from the heat exchanger and discharging the air through the air outlet;
cleaning means for cleaning the filter element as the air filter rotates including a partial vacuum chamber mounted on the enclosure disposed adjacent the external side of the filter element and having an inlet opening closely adjacent and opposite a limited area of the filter element and an outlet connected to the blower so that air is drawn through the outlet creating a partial vacuum in the chamber, said area changing as the air filter rotates so that substantially the entire filter element moves past the inlet opening during each revolution of the air filter, the chamber blanking off the area of the filter element instantaneously opposite the inlet opening and the partial vacuum in the chamber causing an air flow outwards through the filter element area opposite the chamber inlet opening to clean foreign material from said area of the filter element and carry it into the vacuum chamber and through the vacuum chamber outlet; and
agitating means operatively associated with the rotatable air filter for engaging at least a portion of the foreign material adjacent the vacuum chamber outlet to facilitate the movement of material being carried through the outlet.

20. The invention defined in claim 19 wherein the agitating means includes a blade for engaging said portion of the foreign material, said blade being carried by the rotatable air filter and disposed so that it is carried in a circular path intersecting the chamber.

21. The invention defined in claim 20 and further comprising an annular shield carried by said enclosure wall concentric with the filter, intersecting and interrupted by the chamber and substantially enclosing the path of said blade.

22. The invention defined in claim 20 wherein the cleaning means further includes a shear bar disposed adjacent the path swept by the blade so that as the rotatable filter rotates and the blade passes the shear bar, said bar and blade are in a material shearing relationship with each other.

23. The invention defined in claim 19 wherein the connection of the blower to the chamber outlet includes a conduit so that the blower sucks air through the conduit to create the partial vacuum in the chamber, said chamber and conduit cooperating to form a passage for conveying said foreign material and wherein said agitating means includes a blade intermittently traversing said passage.

24. The invention defined in claim 23 wherein said blade extends so as to substantially span the passage.

25. The invention defined in claim 19 wherein the connection of the blower to the chamber outlet includes a conduit so that the blower sucks air through the conduit to create the partial vacuum in the chamber, said chamber and conduit cooperating to form a passage for the conveying of the foreign material, said passage including a change in direction so as to define an elbow, the connection between the chamber outlet and the blower being interrupted adjacent the elbow so as to define a slot-like opening, and wherein the agitating means includes a blade carried by the rotatable filter disposed so as to intermittently enter said passage through the slot-like opening and engage said foreign material.

26. The invention defined in claim 25 wherein the rotatable filter element includes a circular approximately radially extending portion and the elbow is disposed adjacent the periphery of said portion.

27. In an agricultural machine having a mobile body and a power unit carried by the body, the power unit including a wall having an air inlet, an internal combustion engine, a heat exchanger for cooling the engine and a blower operable to draw cooling air through the inlet and over the heat exchanger, an improved air filter for removing foreign material from the cooling air comprising:

a spindle carried by the wall;

a rotatable filter element carrier including means for rotatably mounting the carrier on the spindle and having a rim concentric with the spindle;

a generally circular filter element of flexible foraminous material spanning the exterior side of the carrier and secured to said rim for intercepting foreign material carried by the cooling air, the filter element and carrier substantially covering the inlet; and means for tensioning the filter element engaging the element near its center and urging it axially away from the carrier so as to shape and hold the filter element in a nearly flat generally conical form concentric with the spindle.

28. The invention defined in claim 27 wherein the means for tensioning includes a helical compression spring threaded onto the spindle.

29. The invention defined in claim 28 wherein the spring is disposed between the carrier and the filter element.

30. The invention defined in claim 29 and further including a partial vacuum chamber having a wall and an inlet opening spanning a portion of the air inlet adjacent the exterior side of the filter element, and an outlet connected to the blower so that the blower sucks foreign material from the element and carries it through the chamber outlet.

31. The invention defined in claim 30 and further comprising a baffle approximately opposite and spanning the chamber opening adjacent the interior side of the filter element and supported rigidly cantilever fashion by the spindle between the carrier and the filter element.

32. The invention defined in claim 30 wherein the connection between the vacuum chamber outlet and the blower being interrupted to define a slot-like opening adjacent the vacuum chamber outlet and further comprising a blade carried by the carrier rim and disposed to pass through the slot-like opening as the carrier is rotated and engage at least a portion of said foreign material adjacent the chamber outlet to facilitate its passage through the outlet.

33. The invention defined in claim 27 wherein the material of the filter element has an open area of approximately 50 percent.

* * * * *